United States Patent
Poelman et al.

(10) Patent No.: US 9,002,778 B2
(45) Date of Patent: Apr. 7, 2015

(54) DESIGNING AGGREGATES BASED ON ACCESS PATTERNS IN DIMENSIONS

(75) Inventors: John Squires Poelman, San Jose, CA (US); Gary Robinson, Morgan Hill, CA (US); Alvin Hon Lam So, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 2599 days.

(21) Appl. No.: 10/874,541

(22) Filed: Jun. 22, 2004

(65) Prior Publication Data

US 2005/0283375 A1 Dec. 22, 2005

(51) Int. Cl.
*G06F 7/00* (2006.01)
*G06F 17/30* (2006.01)

(52) U.S. Cl.
CPC .... *G06F 17/30592* (2013.01); *G06F 17/30489* (2013.01)

(58) Field of Classification Search
USPC .............................. 707/100, 102, 7, 104.1, 10
See application file for complete search history.

(56) References Cited

U.S. PATENT DOCUMENTS

| | | | |
|---|---|---|---|
| 5,822,751 A | 10/1998 | Gray et al. | 707/3 |
| 5,905,985 A | 5/1999 | Malloy et al. | 707/100 |
| 5,978,788 A | 11/1999 | Castelli et al. | 707/2 |
| 6,308,148 B1 * | 10/2001 | Bruins et al. | 703/27 |
| 6,434,544 B1 | 8/2002 | Bakalash et al. | 707/2 |
| 6,434,557 B1 | 8/2002 | Egilsson et al. | 707/5 |
| 6,456,999 B1 | 9/2002 | Netz | 707/2 |
| 6,549,907 B1 | 4/2003 | Fayyad et al. | 707/101 |
| 6,567,803 B1 | 5/2003 | Ramasamy et al. | 707/4 |
| 6,574,619 B1 | 6/2003 | Reddy et al. | 707/2 |
| 6,581,068 B1 * | 6/2003 | Bensoussan et al. | 707/104.1 |
| 6,601,062 B1 | 7/2003 | Deshpande et al. | 707/3 |
| 6,628,312 B1 | 9/2003 | Rao et al. | 345/853 |
| 6,651,055 B1 | 11/2003 | Kilmer et al. | 707/3 |
| 6,868,439 B2 * | 3/2005 | Basu et al. | 709/213 |
| 7,099,892 B1 * | 8/2006 | Luo et al. | 707/104.1 |
| 7,257,569 B2 * | 8/2007 | Elder et al. | 707/731 |
| 7,792,795 B1 * | 9/2010 | Swartz et al. | 707/627 |
| 2003/0195940 A1 * | 10/2003 | Basu et al. | 709/213 |
| 2004/0088276 A1 * | 5/2004 | Elder et al. | 707/1 |
| 2004/0088312 A1 * | 5/2004 | Elder et al. | 707/101 |
| 2004/0133577 A1 * | 7/2004 | Miloushev et al. | 707/10 |
| 2005/0038768 A1 * | 2/2005 | Morris | 707/1 |

FOREIGN PATENT DOCUMENTS

| | | | | |
|---|---|---|---|---|
| EP | 1195694 A2 | 4/2002 | | G06F 17/30 |
| JP | 2001282590 | 10/2001 | | G06F 12/00 |

OTHER PUBLICATIONS

N.G.Colossi et al., filed Jan. 13, 2003, U.S. Appl. No. 10/341,763, "Method, System, and Program for Specifying Multidimensional Calculations for a Relational OLAP Engine," assignee International Business Machines Corporation.

* cited by examiner

*Primary Examiner* — Hosain Alam
*Assistant Examiner* — Eliyah S Harper
(74) *Attorney, Agent, or Firm* — Mollborn Patents, Inc.; Fredrik Mollborn

(57) ABSTRACT

In various embodiments, methods define an analysis window for a dimensional model in accordance with a window template and a starting point. One or more aggregate definitions are produced based on the analysis window. In another embodiment, the dimensional model comprises a time dimension, and the window template is associated with the time dimension. In yet another embodiment, the starting point is changed to a new starting point, and a new analysis window is defined using the new starting point.

24 Claims, 14 Drawing Sheets

170 ─➤

| Dimension Level (102) | Current (104) | Prior (106) | Number Prior (172) | Parallel (108) | Number Parallel (174) | Parallel-reference level (109) |
|---|---|---|---|---|---|---|

| Dimension Levels | User Selections | | | | |
|---|---|---|---|---|---|
| | Current | Prior | Number Prior | Parallel | Number Parallel |
| Year | Yes | Yes | 1 | N/A | N/A |
| Quarter | Yes | Yes | 2 | Yes | 2 |
| Month | Yes | Yes | 3 | Yes | 2 |

Column 1 (2002):
2002
Qtr1
Jan
Feb
Mar  (212)
Qtr2
Apr
May  (222)
June
Qtr3  (220)
July
Aug
Sept
Qtr4
Oct  (208)
Nov
Dec Column 2 (2003, 204):
[2003]
Qtr1
Jan
Feb  (210)
Mar
Qtr2
Apr
May
June
Qtr3
July
Aug
Sept
[Qtr4]
Oct
Nov
Dec Column 3 (2004, 202):
[2004]  206
Qtr1
Jan
[Feb]  214
Mar  216
[Qtr2]  200
Apr  218
May  198
June
Qtr3
July
Aug
Sept
Qtr4
Oct
Nov
Dec

Figure 9

Column 1 (2002):
2002
Qtr1
Jan
Feb
Mar
Qtr2
Apr
May
June
[Qtr3]
July
Aug
Sept
Qtr4
Oct
Nov
Dec Column 2 (2003):
[2003]
Qtr1
Jan
Feb
Mar
Qtr2
Apr
May
June
[Qtr3]
July
Aug
[Sept]
Qtr4
Oct
Nov
Dec Column 3 (2004, 254):
[2004]
[Qtr1]
Jan
Feb
Mar
[Qtr2]
Apr
May
[June]  232
[Qtr3]
[July]
[Aug]  230
[Sept]
Qtr4
Oct
Nov
Dec

Figure 10

DESIGNING AGGREGATES BASED ON ACCESS PATTERNS IN DIMENSIONS

BACKGROUND OF THE INVENTION 1.0 Field of the Invention

This invention relates generally to online analytical processing (OLAP) systems and more particularly to designing aggregates based on access patterns in the dimensions of a dimensional model in an OLAP system.

2.0 Description of the Related Art

Business analysts analyze data to determine the state of their business. Business data typically comprises sales, product and financial data over various time periods. Typically, new business data is received for various time periods. A time period may be a day, week, month, quarter or year.

Dimensions are collections of related attributes of the data values of the business, for example, product, market, time, channel, scenario and customer. To understand their businesses, business analysts frequently work with data which is aggregated across dimensions. To provide this information, low level data, at the transaction level or lower, is aggregated across various business dimensions. This provides analysts with the ability to explore business information in context, for example, sales by product by customer by time, or defects by product by manufacturing plant by time.

In an OLAP system, dimensional models allow business analysts to interactively explore information across multiple viewpoints at multiple levels of aggregation. A dimensional model typically has many dimensions. The business data is typically aggregated across the various dimensions to provide different views of the data at different levels of aggregation. The data may be aggregated over various periods of time, by geography, by teams and by product, depending on the type and organization of the business. Aggregated data is commonly referred to as an aggregate. For example, an aggregate may be the sales data for the month of July for a specified product.

In some OLAP systems, the business analyst queries the data for a desired set of aggregates, and the OLAP system computes the aggregates. However, computing the aggregates takes time, and the system response may be slow. To improve performance, aggregates are typically pre-computed and stored. Typically, not all possible aggregates for the dimensional model can be built and stored because the amount of storage space is limited in a computer system, and also because the amount of time to build the aggregates is limited.

OLAP technologies have been developed to provide the aggregates that business analysts use to carry out analysis across multiple points of view or dimensions. These technologies face two competing issues: (a) pre-computing as many aggregates as possible so that analysts can carry out highly interactive analysis and navigation without waiting for the aggregates to be computed; and, (b) limiting the amount of time and space used to pre-compute and store the aggregates because typically, systems do not have sufficient storage space for all pre-computed aggregates for all dimensions, and do not have unlimited amounts of time to build all the aggregates for all dimensions.

Various approaches have been taken to address these competing issues, (a) and (b) above, to provide business analysts with sufficient aggregates to facilitate broad and deep information exploration and analysis. One approach limits the scope of the dimensional model to those aggregates that can be reasonably generated. Another approach does not limit the scope of the model, and identifies a subset of the entire set of possible aggregates to be pre-computed.

A model-based approach to identifying a subset of aggregates to pre-compute is based on analysis of the characteristics of the dimensional model and the data to determine which aggregates have the most utility and will contribute most to performance improvements. However, the model-based approach may not identify some aggregates that are frequently accessed or may identify aggregates that are infrequently accessed.

A query-based approach to generating pre-computed aggregates is based on the analysis of actual queries submitted by users. The query-based approach will discover aggregates which are most relevant to the set of queries being analyzed. However, the query-based approach is limited in scope to identifying aggregates in accordance with previous queries. When the queries access different aggregates from those in the previous queries, the pre-computed aggregates may become less useful, and the system becomes less responsive because new aggregates need to be computed.

Therefore, there is a need for an improved technique to identify aggregates which are frequently accessed and which also provide increased utility to improve business analysis.

SUMMARY OF THE INVENTION

To overcome the limitations in the prior art described above, and to overcome other limitations that will become apparent upon reading and understanding the present specification, various embodiments of a method, apparatus, and article of manufacture for designing aggregates are provided.

In one embodiment, an analysis window is defined for a dimensional model in accordance with a window template and a starting point. One or more aggregate definitions are produced based on the analysis window. In another embodiment, the starting point is changed to a new starting point, and a new analysis window is defined in accordance with the window template and the new starting point. In yet another embodiment, the aggregate definitions are adjusted based on the new analysis window.

In this way, aggregates which are frequently accessed and which also provide increased utility to improve business analysis can be identified and designed.

BRIEF DESCRIPTION OF THE DRAWINGS

The teachings of the present invention can be readily understood by considering the following detailed description in conjunction with the accompanying drawings, in which:

FIG. 7 depicts another embodiment of the window template of FIG. 1;

FIG. 8 depicts an exemplary window template for a dimensional model in accordance with the embodiment of the window template of FIG. 7;

FIG. 9 depicts an application of the window template of FIG. 8 to provide another exemplary analysis window;

FIG. 10 depicts the movement of the analysis window of FIG. 9;

To facilitate understanding, identical reference numerals have been used, where possible, to designate identical elements that are common to some of the figures.

DETAILED DESCRIPTION

Figure 1:
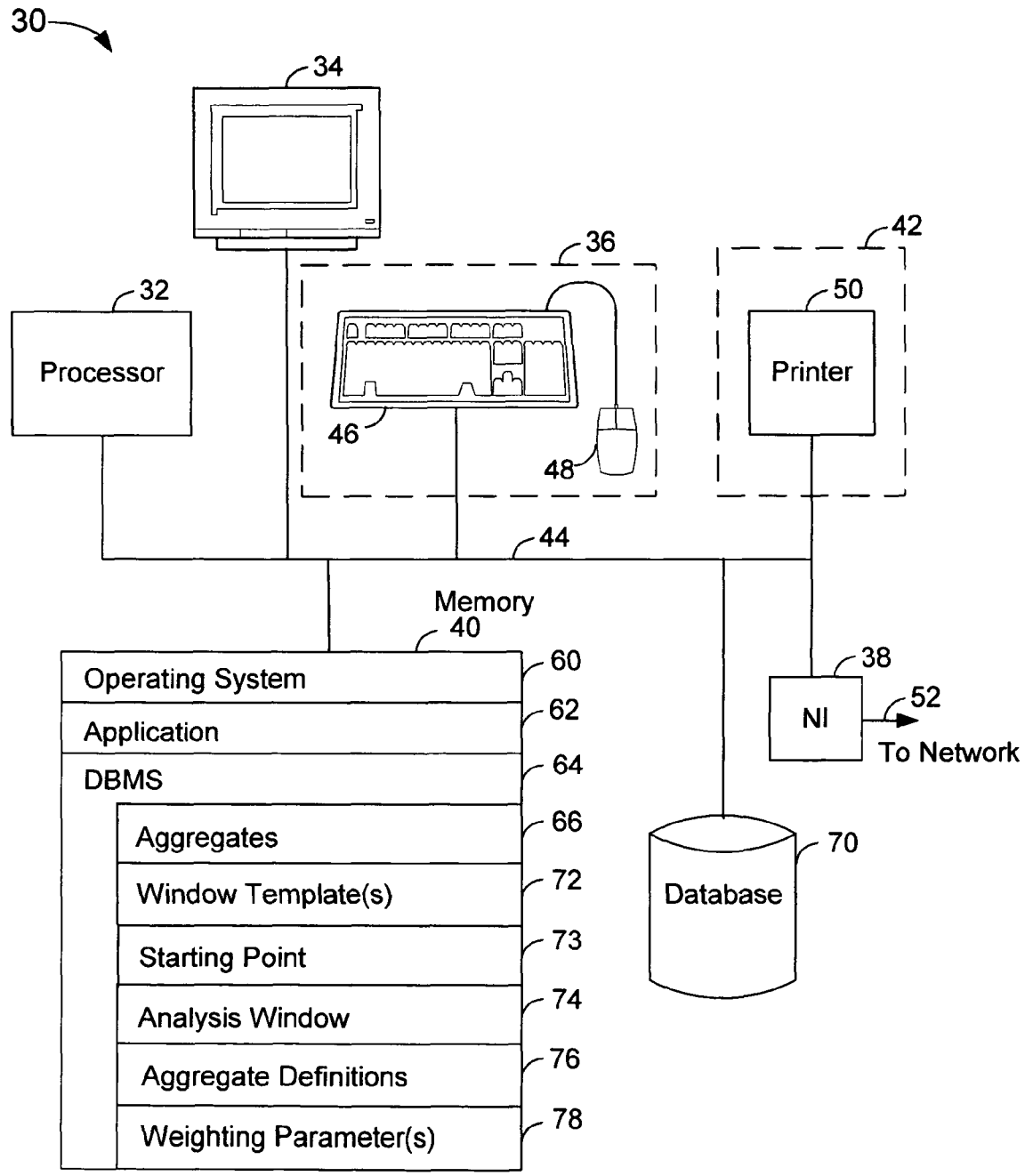
FIG. 1 depicts an illustrative computer system which uses various embodiments of the present invention.

After considering the following description, those skilled in the art will clearly realize that the teachings of the various embodiments of the present invention can be utilized to identify and/or design aggregates. In various embodiments, an analysis window is defined for a dimensional model in accordance with a window template and a starting point. One or more aggregate definitions are produced based on the analysis window. In another embodiment, the window template is associated with a time dimension of a dimensional model. In yet another embodiment, the starting point is changed to a new starting point, a new analysis window is defined in accordance with, the window template and the new starting point, and the aggregate definitions are adjusted based on the new analysis window.

Aggregates are associated with hierarchies that organize the elements or members of each dimension. A dimension has one or more levels, and the levels form the hierarchy of the dimension. Each member is associated with a level. Typically, time is a common dimension across many dimensional models. The time dimension may have levels such as month, quarter and year and members such as January to December, Quarter 1 to Quarter 4 and years 2002, 2003 and 2004. One exemplary hierarchy for the time dimension is the set of levels: Day→Month→Quarter→Year, where "→" indicates "aggregates to". Using this example, sales figures at the day level would be aggregated to the month level. The month sales figures would be aggregated to the quarter level, and the quarter level sales figures would be aggregated to the year level. Using dimensional models, aggregates are typically built across multiple dimensions.

The inventors realized that, when using dimensional models to understand the business, analysts often focus their attention on data for the most recent time period. To provide a context for the business information, analysts often compare the information for the most recent time period to the previous period and to the same period last year.

The inventors ascertained that business analysis often exhibits a high degree of locality in certain dimensions. Typically, for the time dimension, analysis is performed for the most recent period, the previous period and the same period last year. Using the exemplary hierarchy described above, an analyst might compare this quarter, last quarter and this quarter last year. Moving down the hierarchy, the analyst would then compare this month, last month and this month last year. The analysis may exhibit a different locality or pattern, depending upon the business. For example, the comparisons may be this month, last month and the same month last quarter. Whatever pattern is present, it will typically involve comparisons that relate the current time period to related time periods. Various levels of the current time period are typically compared to the same levels of different time periods. Therefore, various embodiments of the present invention integrate the locality of the analysis into aggregate design using a window template and starting point to provide an analysis window.

The window template defines the locality in terms of one or more levels of a dimension. The starting point provides a reference for the window template to produce the analysis window. The analysis window is a mapping of the window template to members of a dimension. When the window template is associated with the time dimension, the starting point is used to specify a current time period which is used to map the window template to produce the analysis window.

Aggregate definitions are derived from the analysis window. The derivation depends upon the particular OLAP technology being used. One exemplary technology is a relational database management system. In this exemplary relational database management system, a set of one or more aggregate table definitions are derived from the analysis window and deployed using SQL expressions.

Using various embodiment of the invention, more aggregates are built within a window which analysts typically access frequently. By building more aggregates within this window, analysts gain the advantage of high-speed, highly-interactive analysis based on pre-computed aggregates within a window-of-interest, while aggregates which are of less interest are not pre-computed and stored. Exploiting the locality of the analysis patterns results in aggregates which follow business analysis patterns. In some embodiments, locality in time is integrated into the aggregate design process.

FIG. 1 depicts an illustrative computer system which uses various embodiments of the present invention. The computer system 30 comprises a processor 32, display 34, input interfaces (I/F) 36, communications interface 38, memory 40 and output interface(s) 42, all conventionally coupled by one or more buses 44. The input interfaces 36 comprise a keyboard 46 and mouse 48. The output interface 42 is a printer 50. The communications interface 38 is a network interface (NI) that allows the computer 30 to communicate via a network, such as the Internet. The communications interface 38 may be coupled to a transmission medium 52 such as, for example, twisted pair, coaxial cable or fiber optic cable. In another exemplary embodiment, the communications interface 38 provides a wireless interface, that is, the communications interface 38 uses a wireless transmission medium.

The memory 40 generally comprises different modalities, illustratively semiconductor memory, such as random access memory (RAM), and disk drives. In some embodiments, the memory 40 stores an operating system 60, an application program 62, and a database management system 64 which contains aggregates 66.

Typically, the application 62 is an OLAP program. The application 62 typically accesses the aggregates 66 based on user requests.

The aggregates are typically stored in the computer system 30. In other embodiments, the aggregates may be stored remotely from the application 62 on another computer system and be accessed via the network. Typically, at least one disk drive 70 stores at least a portion of the aggregates in a database for the application 62. In some embodiments, the database management system 64 also stores at least one window template 72. Alternately, the window template is stored as a file in memory 40. In various embodiments, the database management system 64 also stores a starting point 73, an analysis window 74 and aggregate definitions 76. Alternately, the starting point 73, the analysis window 74 and aggregate definitions 76 are stored as files external to the database management system 64. In other embodiments, the database management system 64 stores at least one weighting parameter 78. Alternately, the weighting parameter is stored in a file in memory 40.

In various embodiments, the specific software instructions, data structures and data that implement various embodiments of the present invention are incorporated in the application 62 and/or database management system 64. Generally, an embodiment of the present invention is tangibly embodied in a computer-readable medium, for example, the memory 40 and is comprised of instructions which, when executed by the processor 32, cause the computer system 30 to utilize the present invention. The memory 40 may store a portion of the software instructions, data structures and data for any of the operating system 60, application 62 and database management system 64 in semiconductor memory, while other portions of the software instructions and data are stored in disk memory.

The operating system 60 may be implemented by any conventional operating system, such as z/OS® (Registered Trademark of International Business Machines Corporation), AIX® (Registered Trademark of International Business Machines Corporation), UNIX® (UNIX is a registered trademark of the Open Group in the United States and other countries), WINDOWS® (Registered Trademark of Microsoft Corporation), LINUX® (Registered trademark of Linus Torvalds), Solaris® (Registered trademark of Sun Microsystems Inc.) and HP-UX® (Registered trademark of Hewlett-Packard Development Company, L.P.).

In various embodiments, the present invention may be implemented as a method, apparatus, or article of manufacture using standard programming and/or engineering techniques to produce software, firmware, hardware, or any combination thereof. The term "article of manufacture" (or alternatively, "computer program product") as used herein is intended to encompass a computer program accessible from any computer-readable device, carrier or media. In addition, the software in which various embodiments are implemented may be accessible through the transmission medium, for example, from a server over a network. The article of manufacture in which the code is implemented also encompasses transmission media, such as a network transmission line and wireless transmission media. Thus the article of manufacture may also comprise the medium in which the code is embedded. Those skilled in the art will recognize that many modifications may be made to this configuration without departing from the scope of the present invention.

The exemplary computer system illustrated in FIG. 1 is not intended to limit the present invention. Other alternative hardware environments may be used without departing from the scope of the present invention.

Figure 2:
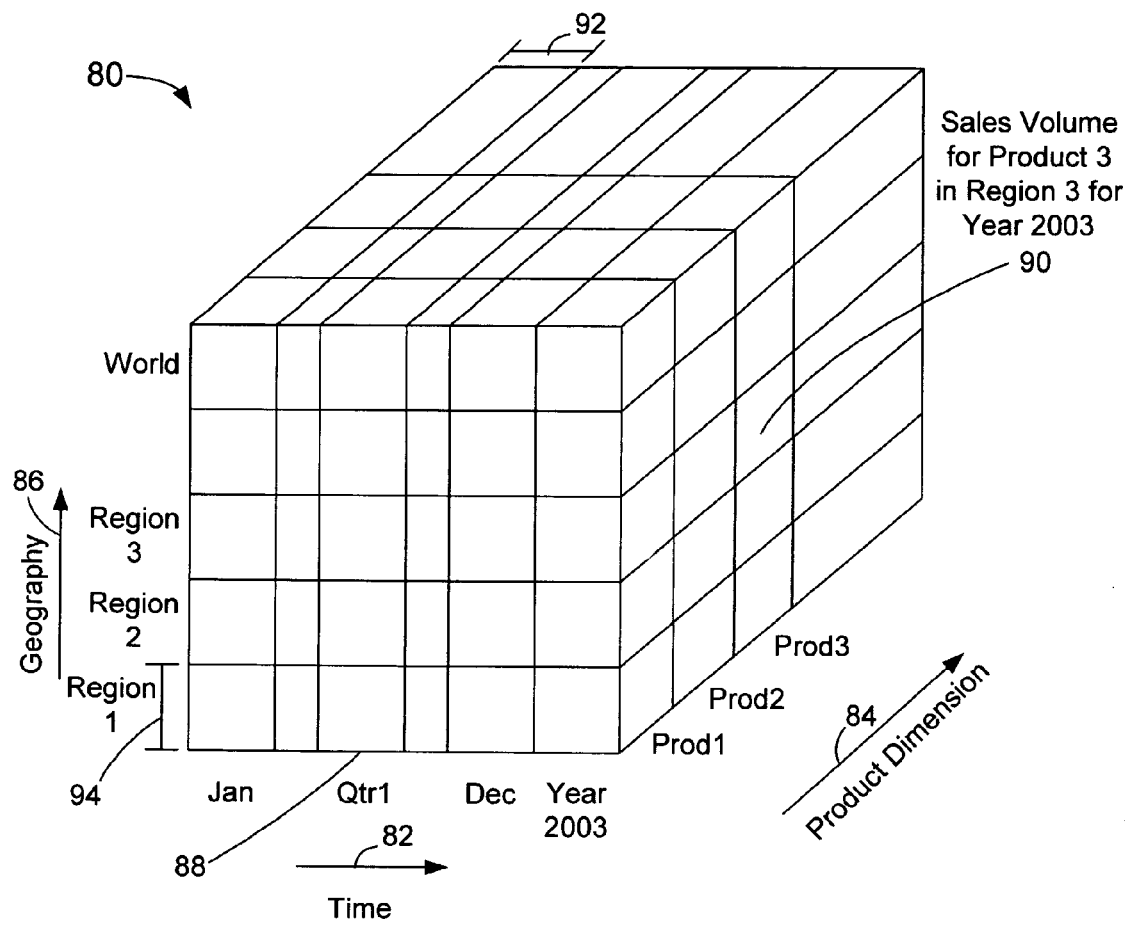
FIG. 2 depicts exemplary dimensional data having three dimensions.

FIG. 2 depicts exemplary dimensional data 80 having three dimensions. The x-axis 82 represents the time dimension, the y-axis 84 represents the product dimension and the z-axis 86 represents geographical areas, that is, a geographical dimension. Each block represents a data point, for example, sales volume, associated with the three dimensions. Some data points are pre-computed from lower level data and are referred to as aggregate data, or aggregates. For example, aggregate 88 represents the sales volume for Quarter 1 (Qtr 1) for product one (Prod1) in geographical region one (Region 1); and aggregate 90 represents the sales volume for year 2003 for product three (Prod3) for geographical region three (Region 3).

A dimension typically has many levels of aggregation. Higher levels of aggregation aggregate more data than lower levels of aggregation. In some embodiments of the time dimension, year is the highest level of aggregation and month is the lowest level of aggregation.

A slice is a subset of an N-dimensional model, where the slice is identified by N or fewer member coordinates, one from each of the dimensions. For example, slice 92 provides the sales volume for January for all geographies and all products. In another example, slice 94 provides the sales volume for region one for the entire time frame for all products.

Various embodiments of the present invention will be described with respect to the time dimension. However, the present invention is not meant to be limited to the time dimension, and can be applied to other dimensions.

Figures 3, 4, 5, 6:
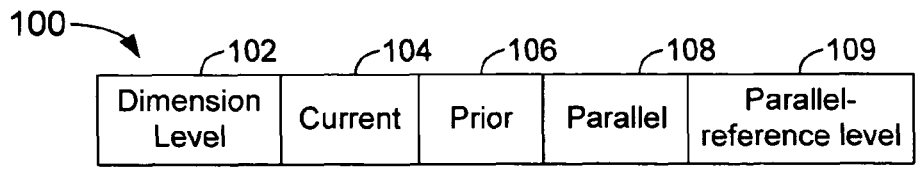
FIG. 3 depicts an embodiment of a window template of FIG. 1.
FIG. 4 depicts an exemplary window template for a dimensional model in accordance with the embodiment of the window template of FIG. 3.
FIG. 5 depicts an application of the window template of FIG. 4 to provide an exemplary analysis window.
FIG. 6 depicts the movement of the analysis window of FIG. 5.

FIG. 3 depicts an embodiment of a window template 100. The window template 100 defines a generalized analysis window which can be moved and applied to specific and related members of a dimension. The window template 100 is used to identify frequently used related aggregates for a dimension by level. In various embodiments, a user defines the window template 100. The window template 100 is instantiated as an analysis window by mapping the window template 100 to members of the dimension based on a starting point. The mapping is to one or more specific members. For example, a level of the time dimension may be "Year," with members 2001, 2002 and 2003; and the window template may be mapped to any of those members.

In various embodiments, for each dimension level 102, the window template 100 comprises a current parameter 104, a prior parameter 106, a parallel parameter 108 and a parallel-reference level parameter 109. The current, prior, parallel and parallel-reference level parameters, 104, 106, 108 and 109, respectively, of the window template 100 are a set of level based coordinates in a dimension of a multidimensional model. The current parameter 104, prior parameter 106 and parallel parameter 108 are used to specify a member or members for which aggregates will be defined. The current parameter 104 refers to a current member, specified by the starting point, when the window template is mapped. The prior parameter 106 refers to the immediately previous member at the same level as the current member when the window template 100 is mapped. The parallel parameter 108 refers to the equivalent member at the same level as the current member, relative to a particular level in the dimension when the window template 100 is mapped. The parallel-reference level parameter 109 is used to determine relative parallel periods. The user typically specifies the current, prior, parallel and parallel-reference level parameters, 104, 106, 108 and 109, respectively, for desired levels in the window template 100. In some embodiments, when the window template 100 refers to a time dimension, the window template 100 specifies a related set of time periods for which aggregates will be defined. For example, when the dimension is time, the related set of time periods may comprise this month (current), last month (prior) and the same month last year (parallel).

Each dimension level of the window template 100 is mapped to a set of members of that dimension based on the starting point in order to define the analysis window. The current member is specified by the starting point. In various embodiments, the starting point is, or is derived from, the system date. In some embodiments, a user specifies the starting point. For example, a company may analyze March's sales figures in May; therefore the starting point is March even though the system date is May. In other embodiments, the starting point is not limited to the time dimension and may be associated with other dimensions.

In an alternate embodiment, the prior parameter 106 is omitted from the window template. In another alternate embodiment, the parallel parameter 108 is omitted from the window template. In yet another alternate embodiment, the parallel-reference level parameter 109 is omitted from the window template. In some embodiments, when the parallel-reference level parameter is omitted, the parallel-reference level is implicitly the highest level of that dimension, or alternately, the highest level of that dimension in the window template.

FIG. 4 depicts an exemplary window template 110 in accordance with the window template 100 of FIG. 3. For convenience, column headings for the dimension levels, current, prior, parallel and parallel-reference level parameters, 112, 114, 116, 118 and 120, respectively, are shown. Typically, column headings are not stored with the data of the window template. In the exemplary window template 110, the dimension is time. In alternate embodiments, other dimensions may be used. In this example, the dimension levels are year 122, quarter 124 and month 126. The current, prior and parallel parameters are relative with respect to the level. For example, for the year level 122, members for the current year and prior year are specified, as shown by the term "Yes" in the Current and Prior columns, 114 and 116, respectively. In other embodiments, a predetermined character(s) or a value represents "Yes", and another predetermined character(s) or value represents "No." In this example, parallel year selections are not available (N/A). In some embodiments, the memory stores yet another predetermined character rather than "N/A." Alternately, "No" is used rather than "N/A". For the quarter level 124, members for current, prior and parallel periods are specified as indicated by the term "Yes" in the appropriate columns, 114, 116 and 118. For the month level 126, members are specified for the current and prior periods, but not for the parallel period. For the quarter level 124, the specified parallel-reference level parameter 120 is "year." Therefore, the parallel quarter is the same quarter in the previous year.

FIG. 5 depicts an exemplary application of the window template 110 of FIG. 4 to define an analysis window. Referring to both FIGS. 4 and 5, the window template 110 of FIG. 4 is mapped to members of a dimensional model, based on the specified starting point, to define the analysis window and therefore, the aggregates. In FIG. 5, an exemplary time dimension 130 has dimension levels and members. Two years, 2003 and 2004, columns 132 and 134, respectively, are shown. The members that are specified when the window template 110 is associated with, and more particularly, mapped onto the dimensional model to define the analysis window, are enclosed in blocks. The starting point specifies that the current month is May, the current quarter is the second quarter (Qtr2) and the current year is 2004. Because the window template 110 specifies that aggregates are generated for the current month, quarter and year, the analysis window comprises May 2004, quarter two (Qtr2) of 2004, and 2004 which are enclosed in blocks 136, 138 and 140, respectively. For the year level, the window template 110 specifies the prior year relative to the starting point, therefore the analysis window further comprises the prior year relative to 2004, which is 2003, and is enclosed by block 142. Because the window template 110 specifies the prior and parallel quarters, the analysis window further comprises the first quarter (Qtr1) of 2004, enclosed by block 144, and the second quarter (Qtr2) of 2003, enclosed by block 146. Because the window template 110 specifies a prior month, the analysis window further comprises April (Apr) 2004 which is enclosed by block 148.

FIG. 6 depicts the movement of the exemplary analysis window of FIG. 5 to another time period in the dimensional model. In FIG. 6, the analysis window is changed. In this example, based on the starting point, the current month is September (Sept), the current quarter is the third quarter (Qtr3) and the current year is 2004. Referring to both the window template of FIG. 4 and the dimensional model of FIG. 6, the movement of the analysis window using the window template of FIG. 4 will be described. The current and prior years, 2004 and 2003, are enclosed by blocks 156 and 158, respectively. The current quarter is moved to the third quarter (Qtr3) 154, the prior quarter is moved to the second quarter (Qtr2) which is enclosed by block 160, and the parallel quarter is moved to the third quarter (Qtr3) of 2003, which is enclosed by block 162. The current month is moved to September (Sept) 2004 which is enclosed by block 152; and the prior month is moved to August (Aug) 2004 which is enclosed by block 164.

The window template 110 of FIG. 4, described above, has a parallel-reference level parameter of "year." In another example, if a parallel-reference level of "quarter" is specified for the "month" level of the window template 110 of FIG. 4, then for May 2004 136 (FIG. 5), the parallel month is February (Feb) 2004. In yet another example, if the parallel-reference level parameter was omitted from the window template 110 of FIG. 4, the parallel-reference level is year because "year" is the highest level in that window template.

FIG. 7 depicts another embodiment of the window template of FIG. 1. The window template 170 has a level column and the same four parameters as the window template 100 of FIG. 3, as well as two additional parameters. A number prior parameter 172 allows more than one prior member to be specified and a number parallel parameter 174 allows more than one parallel member to be specified.

In an alternate embodiment, the number prior parameter 172 is omitted. In another alternate embodiment, the number parallel parameter 174 is omitted.

FIG. 8 depicts an exemplary window template 180 in accordance with the embodiment of the window template 170 of FIG. 7. In this example, the dimension is time. The exemplary window template 180 of FIG. 8 is similar to the exemplary window template 110 of FIG. 4 except that one prior year, two prior quarters, two parallel quarters, three prior months and two parallel months are specified. Since the window template 180 omits the parallel-reference level parameter, by default, for the time dimension, the parallel-reference level parameter is defined as year.

FIG. 9 depicts an application of the window template 180 of FIG. 8 to define an exemplary analysis window. FIG. 9 has an exemplary time dimension 190 comprising dimension levels and members. Various members for three years, 2002, 2003 and 2004, columns 192, 194 and 196, respectively, are shown. The starting point specifies that the current month, quarter and year are May, the second quarter (Qtr2) and 2004, respectively. Referring also to FIG. 8, because the window template 180 specifies the current month, quarter and year, the analysis window comprises May 2004, second quarter (Qtr2) of 2004 and 2004, enclosed by blocks 198, 200 and 202, respectively. For the year level, the window template 180 specifies one prior year, therefore the analysis window also comprises one prior year, 2003, enclosed by block 204. For the quarter level, because the window template 180 specifies two prior quarters, the analysis window further comprises two prior quarters, the first quarter (Qtr1) of 2004 and the fourth quarter (Qtr4) of 2003, enclosed by blocks 206 and 208, respectively. Because the window template 180 specifies two parallel quarters, the analysis window also comprises the second quarter (Qtr2) of 2003 and the second quarter (Qtr2) of 2002, enclosed by blocks 210 and 212, respectively. For the month level, because the window template 180 specifies three prior months, the analysis window further comprises three prior months, February (Feb), March (Mar) and April (Apr) of 2004, enclosed by blocks 214, 216 and 218, respectively. Because the window template 180 specifies two parallel months, the analysis window also comprises May 2003 and May 2002, enclosed by blocks 220 and 222, respectively.

FIG. 10 depicts the movement of the analysis window of FIG. 9 to another time period. In FIG. 10, based on the starting point, the current month, quarter and year of the analysis window are September (Sept), quarter three (Qtr3) and 2004, enclosed by blocks 230, 232 and 254, respectively. The prior and parallel members are also mapped based on the starting point and the prior, number prior, parallel, and number parallel parameters. The movement of an analysis window to another time period has been described with reference to FIG. 6 and will not be further described.

Figure 11:
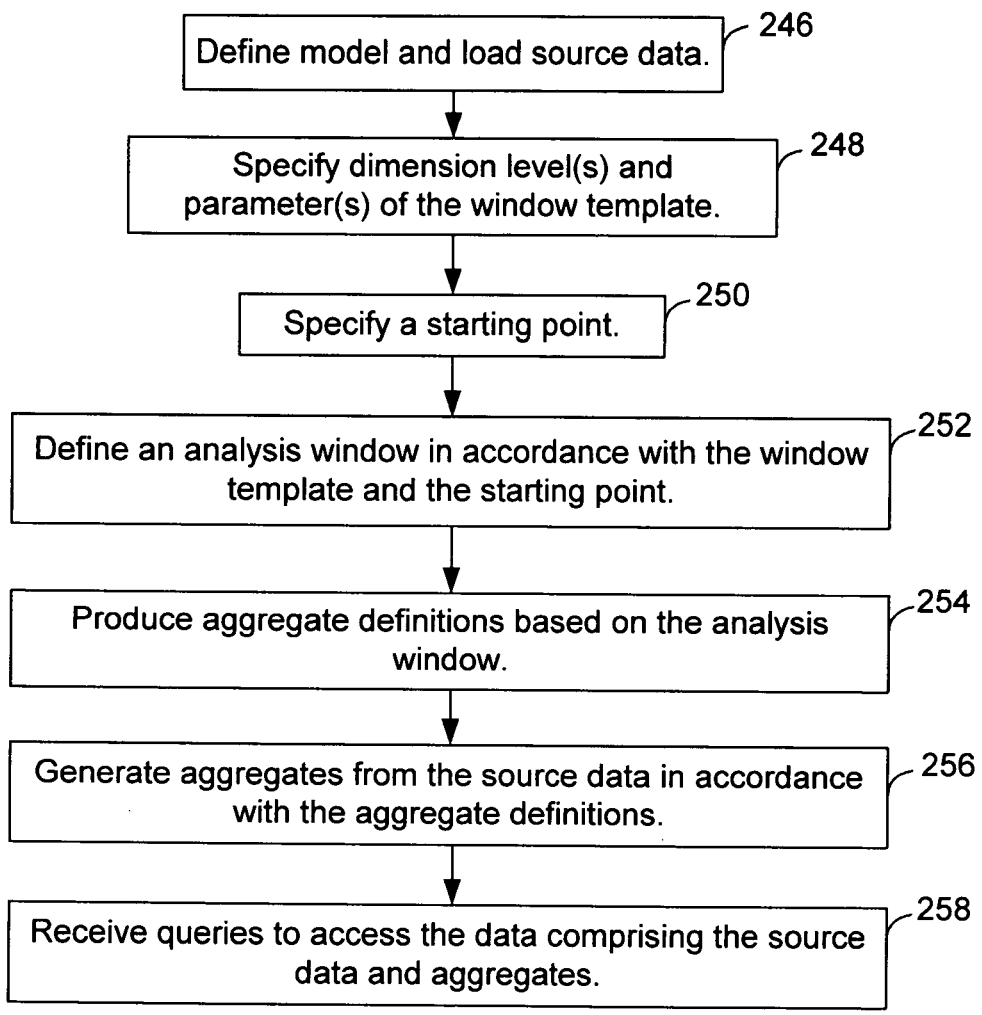
FIG. 11 depicts a flowchart of an embodiment of a technique to design and generate aggregates in accordance with a window template of FIG. 1.

FIG. 11 depicts a flowchart of an embodiment of a technique to design and generate aggregates in accordance with a window template. In various embodiments, the application 62 of FIG. 1 implements the flowchart of FIG. 11.

In step 246, a model is defined and the source data is loaded. The model comprises dimensions, levels within the dimensions and members. In step 248, the dimension level(s) and associated parameter(s) of the window template are specified. In various embodiments, the user can change the window template at any time.

In step 250, a starting point is specified. In some embodiments, the user specifies the starting point. In other embodiments, the starting point is derived from the system clock.

In step 252, an analysis window 74 (FIG. 1) is defined for the model in accordance with the window template and the starting point. In particular, the window template is mapped to members of the dimensional model based on the starting point to define the analysis window 74 (FIG. 1). For example, using the window template 180 of FIG. 8 and the dimensional model of FIG. 9 with a starting point of May 2004, the defined members of the analysis window 74 (FIG. 1) are enclosed by the blocks of FIG. 9. In some embodiments, the members of the analysis window 74 (FIG. 1) are stored in a list, array, or table in a relational database management system. For example, the array may specify a set of members such as {2004, Qtr2 2004, and May 2004}.

In step 254, one or more aggregate definitions 76 (FIG. 1) are produced based on the analysis window 74 (FIG. 1). In various embodiments, the aggregate definitions 76 (FIG. 1) are created by mapping from the analysis window to a particular aggregate generation technique, for example, Structured Query Language (SQL) instructions, a script, or an internal code form. In some embodiments, one or more SQL insert statements are defined to generate aggregates based on the list, array or table of step 252.

In step 256, aggregates 66 (FIG. 1) are generated from the source data in accordance with the aggregate definitions 76 (FIG. 1). In various embodiments, the aggregates are generated by invoking the SQL instructions, script or code. In step 258, queries to access the source data and aggregates are received. Typically the user, such as a business analyst, issues the queries to access and analyze the data.

Figure 12:
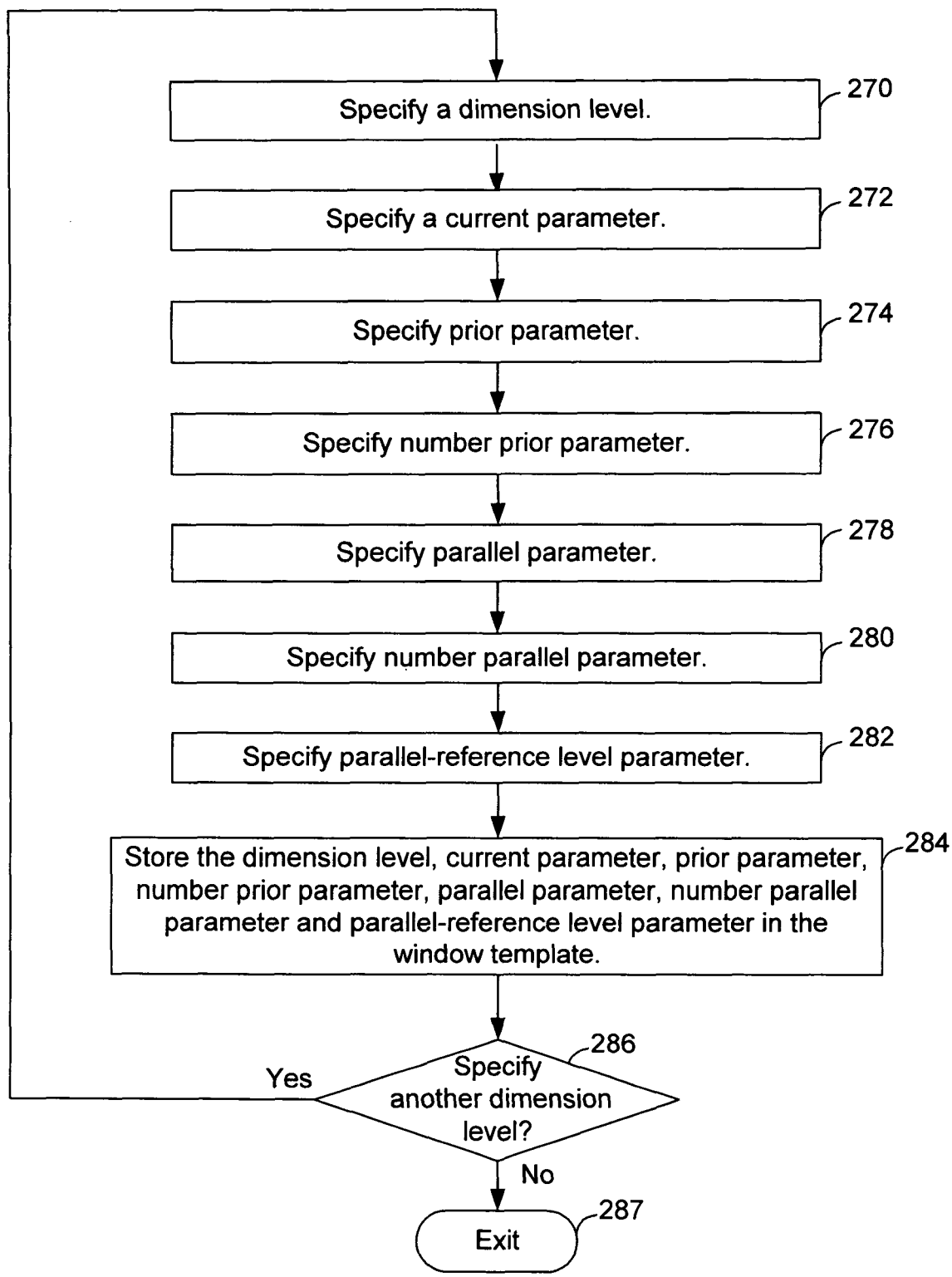
FIG. 12 depicts a flowchart of an embodiment of the step of specifying the dimension levels and parameters of the window template of FIG. 11.

FIG. 12 depicts a flowchart of an embodiment of the specification or generation of the window template of step 248 of FIG. 11. In various embodiments, a user defines the window template.

In step 270, a dimension level is specified. In step 272, the current parameter is specified for the dimension level. In step 274, the prior parameter is specified for the level(s). In step 276, the number prior parameter is specified for the level(s). In step 278, the parallel parameter is specified for the level(s). In step 280, the number parallel parameter is specified for the level(s). In step 282, a parallel-reference level parameter is specified. In step 284, the dimension level, the current parameter, the prior parameter, the number prior parameter, the parallel parameter, the number parallel parameter and the parallel-reference level parameter are stored in the window template. Step 286 determines whether another dimension level is to be specified. When another dimension level is to be specified, the step 286 proceeds to step 270. When step 286 determines that no more dimension levels are to be specified, in step 287, the flowchart exits.

In various embodiments, the window template is stored in a table in the database management system. In alternate embodiments, the window template is stored in a list or array. In some embodiments, the window template is stored in a file. Alternately, the window template may be specified and stored in memory in non-persistent storage.

In other embodiments, at least one or more of the following parameters and steps may be omitted: the current parameter, the prior parameter, the number prior parameter, the parallel parameter, the number parallel parameter, and the parallel-reference level parameter, and steps 272, 274, 276, 278, 280 and 282, respectively.

Figure 13:
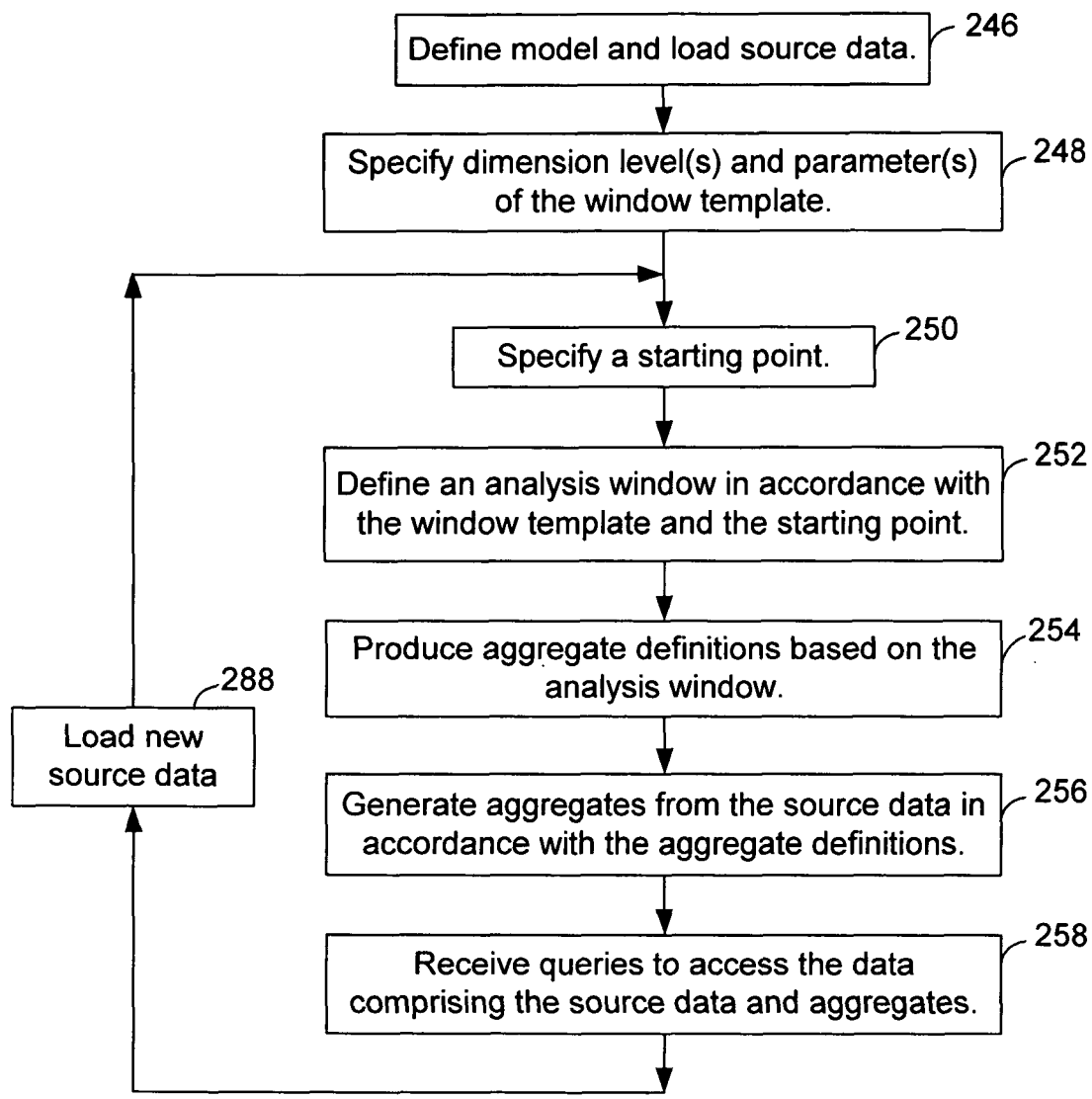
FIG. 13 depicts a flowchart of another embodiment of a technique to design and generate aggregates in accordance with a window template which loads new source data and changes the starting point to move the analysis window.

FIG. 13 depicts a flowchart of another embodiment of a technique to design and generate aggregates in accordance with a window template which loads new source data and changes the starting point to a new starting point. In various embodiments, the flowchart of FIG. 13 is implemented in the application 62 of FIG. 1. The flowchart of FIG. 13 is similar to the flowchart of FIG. 11; therefore the differences will be described. In step 288, new source data is loaded. For example, the new source data may be for a more recent time period. Step 288 proceeds to 250 to specify a new starting point. In other words, the starting point is changed to a new starting point. Specifying a new starting point moves the analysis window.

Figure 14:
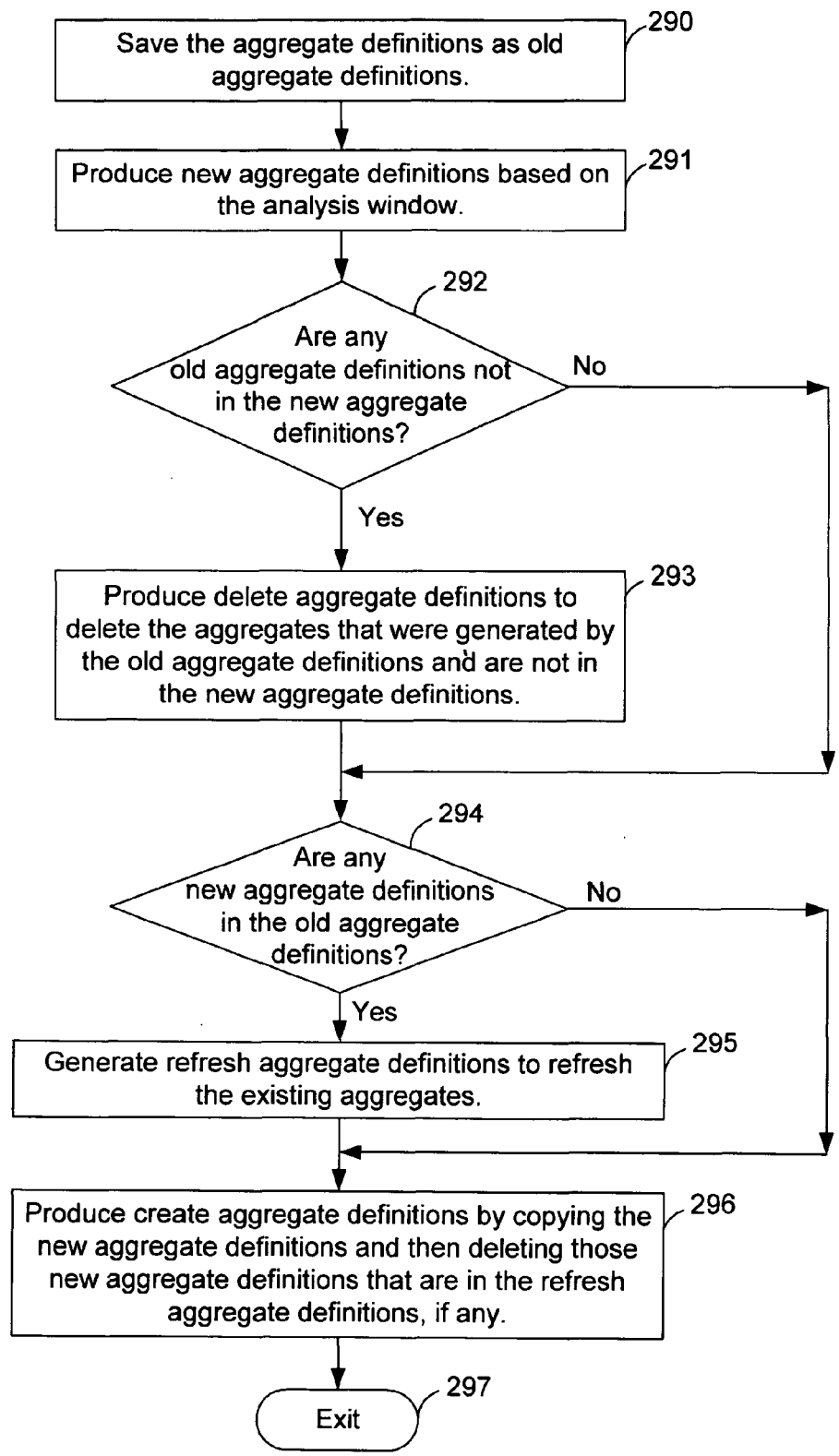
FIG. 14 depicts a flowchart of another embodiment of the step of producing aggregate definitions based on the analysis window of FIG. 13.

FIG. 14 depicts a flowchart of an alternate embodiment of step 254 of FIG. 13 to produce aggregate definitions based on the analysis window. The flowchart of FIG. 14 adjusts the aggregate definitions such that aggregates outside the analysis window of the window template will be deleted, existing aggregates within the analysis window of the window template will be refreshed and new aggregates will be created. In step 290, the aggregate definitions are saved as old aggregate definitions. The old aggregate definitions are to create all the aggregates in the old analysis window. In step 291, new aggregate definitions are produced to create all the aggregates in accordance with the analysis window associated with the new starting point.

Step 292 determines whether any old aggregate definitions are not in the new aggregate definitions. When step 292 determines that one or more old aggregate definitions are not in the new aggregate definitions, in step 293, delete aggregate definitions are produced to delete the aggregates that were generated by the old aggregate definitions and are not in the new aggregate definitions. Step 293 proceeds to step 294.

When step 292 determines that all of the old aggregate definitions are in the new aggregate definitions, step 292 proceeds to step 294.

Step 294 determines whether any new aggregate definitions are also in the old aggregate definitions. When step 294 determines that at least one new aggregate definition is in the old aggregate definitions, in step 295, refresh aggregate definitions are generated to refresh the existing aggregates from the old aggregate definitions that are in the new aggregate definitions with the new source data. In step 296, create aggregate definitions are produced by copying the new aggregate definitions, and then deleting those new aggregate definitions that are in the old aggregate definitions. The create aggregate definitions may be a subset of the new aggregate definitions. In step 297, the flowchart exits. When step 294 determines that no new aggregate definitions are in the old aggregate definitions, step 294 proceeds to step 296. In this way, the aggregate definitions passed to step 256 of FIG. 13 comprise create aggregate definitions for new aggregates, refresh aggregate definitions for existing aggregates and delete aggregate definitions for existing aggregates that are not part of the analysis window. In some embodiments, the create aggregate definitions will create a new summary table including the aggregates to store in the summary table; the refresh aggregate definitions will update the aggregates in an existing summary table; and the delete aggregate definitions will delete a summary table.

In FIG. 13, step 256 executes the aggregate definitions. In some embodiments, step 256 executes or invokes the create, refresh and delete aggregate definitions to generate new aggregates, refresh existing aggregates and delete aggregates, respectively.

Figure 15:
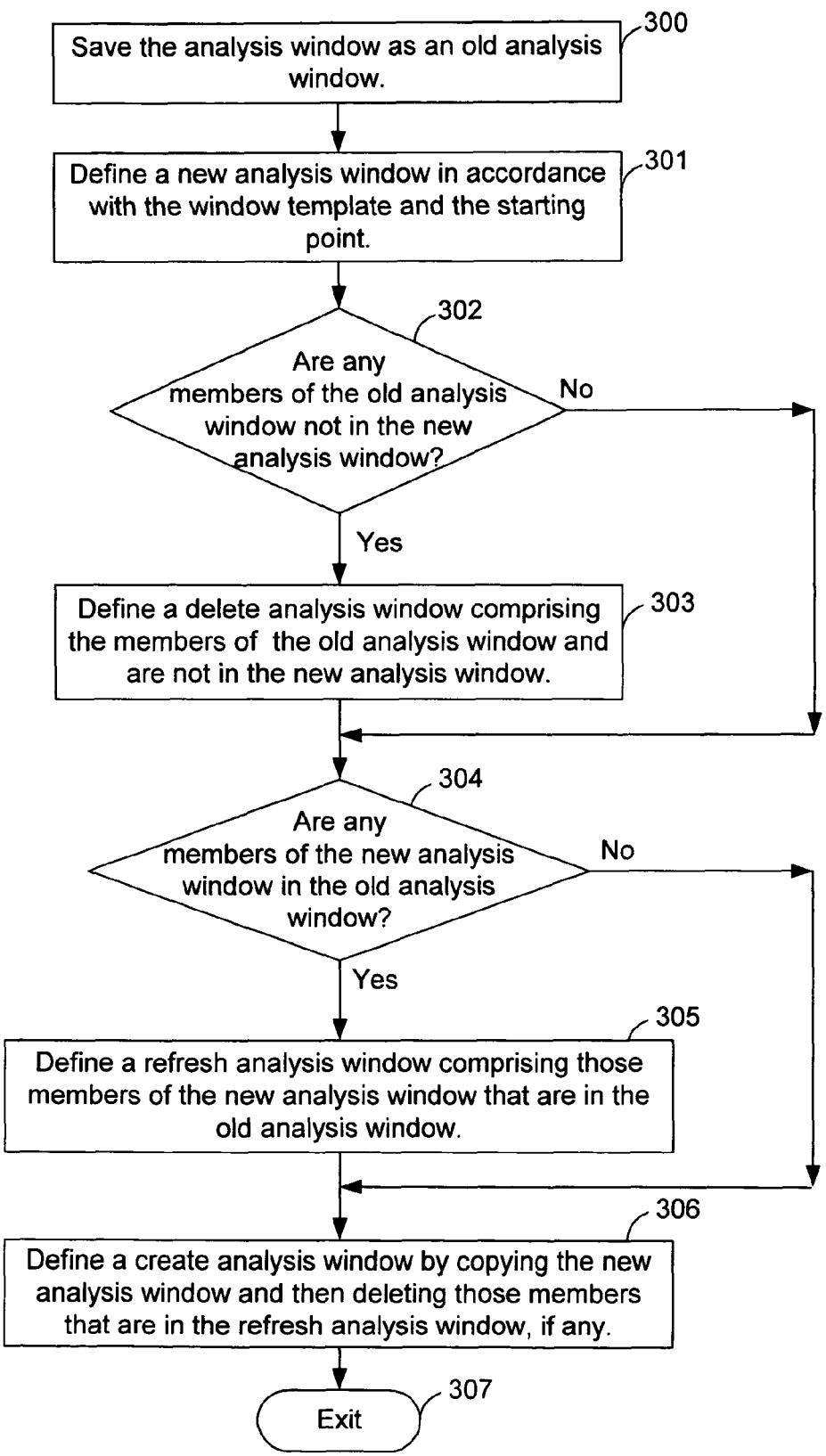
FIG. 15 depicts a flowchart of another embodiment of the step of defining an analysis window of FIG. 13.

FIG. 15 depicts a flowchart of another embodiment of step 252 of FIG. 13 to define the analysis window. In step 300, the analysis window is saved as an old analysis window. In step 301, a new analysis window is defined in accordance with the window template and the starting point. Step 302 determines whether any members of the old analysis window are not in the new analysis window. When step 302 determines that at least one member of the old analysis window is not in the new analysis window, in step 303, a delete analysis window is defined to delete the aggregates associated with the members of the old analysis window that are not in the new analysis window. The delete analysis window comprises members of the old analysis window that are not in the new analysis window. Step 304 determines whether any members of the new analysis window are in the old analysis window. When at least one member of the new analysis window is in the old analysis window, in step 305, a refresh analysis window is defined. The refresh analysis window comprises those members of the new analysis window that are in the old analysis window. The aggregates associated with the members of the refresh analysis window already exist and will be updated with the new source data. In step 306, a create analysis window is defined by copying the new analysis window and then deleting those members that are in the refresh analysis window, if any. The aggregates associated with the members of the create analysis window do not yet exist and will be created. In step 307, the flowchart exits.

When step 302 determines that all members of the old analysis window are in the new analysis window, step 302 proceeds to step 304. When step 304 determines that no members of the new analysis window are in the old analysis window, step 304 proceeds to step 306.

In FIG. 13, step 254 is modified to produce aggregate definitions based on the create, refresh and delete analysis windows.

In various embodiments, at least one weighting parameter provides an administrator with the ability to influence the aggregate design when the window template is used in conjunction with model based, query based or other aggregate design techniques. The weighting parameter indicates if aggregates should be designed entirely within the analysis window of the window template or if the analysis window of the window template should influence the aggregate definitions to some degree.

Figure 16:
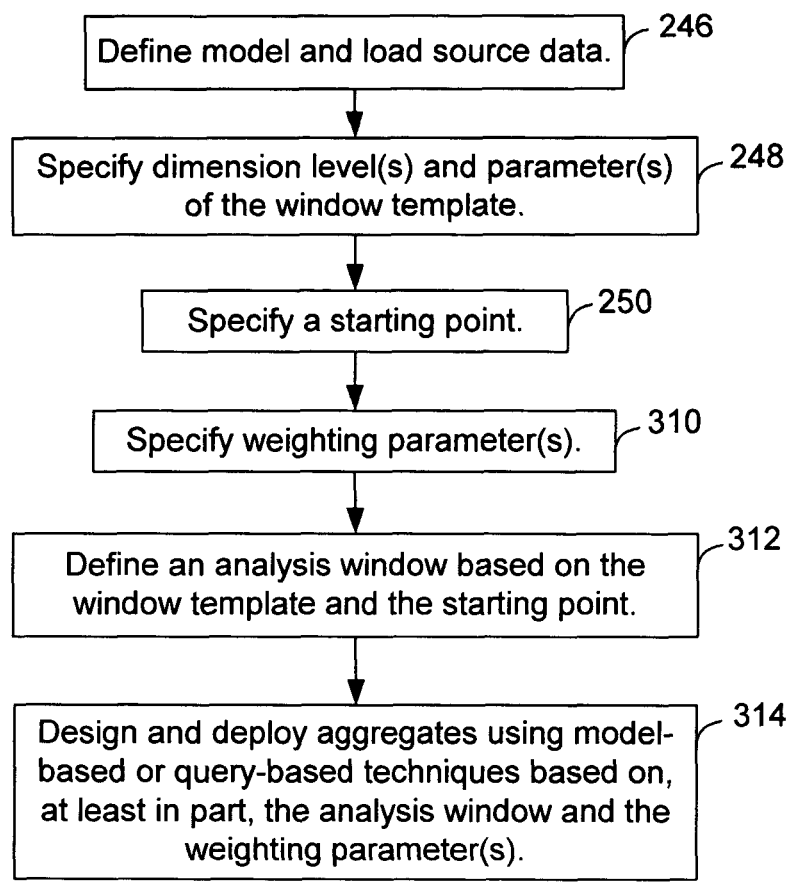
FIG. 16 depicts a flowchart of an embodiment of a technique to design and generate aggregates in accordance with a window template and a weighting parameter.

FIG. 16 depicts a flowchart of an embodiment of a technique to design and generate aggregates in accordance with a window template and a weighting parameter. In various embodiments, the flowchart of FIG. 16 is implemented in the application 62 of FIG. 1. Steps 246, 248 and 250 of the flowchart of FIG. 16 are the same as in FIG. 11 and will not be further described.

In step 310, one or more weighting parameters are specified. In various embodiments, the user specifies the value of the weighting parameter. In some embodiments, a single weighting parameter is associated with a window template and associated analysis window. In other embodiments, multiple weighting parameters are associated with the window template and analysis window.

In various embodiments, the weighting parameter has a value between 0 and 100%. If the analysis window is to be used exclusively, that is, the weighting parameter is equal to 100%, only aggregates within the analysis window will be defined. When the weighting parameter is equal to 0%, then the analysis window will not influence the conventional techniques that will be used to define aggregates. When the weighting parameter is equal to approximately 25%, aggregates defined using conventional techniques will be favored. When the weighting parameter is equal to 50%, the aggregates in the analysis window and aggregates associated with conventional techniques have equal weight. When the weighting parameter is equal to 75%, aggregates in the analysis window will be favored.

In step 312, the analysis window is defined in accordance with the window template and the starting point. In step 314, aggregates are designed and deployed using model-based or query-based techniques based on, at least in part, the analysis window and the weighting parameter(s). The analysis window and the weighting(s) parameters are supplied to the model-based or query-based technique, and the model-based or query-based technique uses the analysis window and weighting parameter(s) as desired. For example, the weighting parameter might be used to constrain the analysis carried out by the model and query based approaches so that aggregates are only defined within the analysis window. In various embodiments, aggregate definitions are produced based on, at least in part, the analysis window and the weighting parameter. In this way, the window template and weighting parameter(s) can influence the design and generation of aggregates using model-based and query-based techniques.

In various other embodiments, in step 312, the analysis window is defined for the model in accordance with, at least in part, the window template and the starting point. For example, in some of these embodiments, other techniques may be applied to define the analysis window such that the analysis window comprises one or more members which are outside the window template. In some other of these embodiments, techniques may be applied to remove a member from the analysis window that was defined in accordance with the window template such as when storage space is limited.

In some embodiments, the weighting parameter of step 310 is automatically determined from a query analysis. The analysis can determine the weighting parameter based on the distribution of queries inside and outside of the analysis window.

Figure 17:
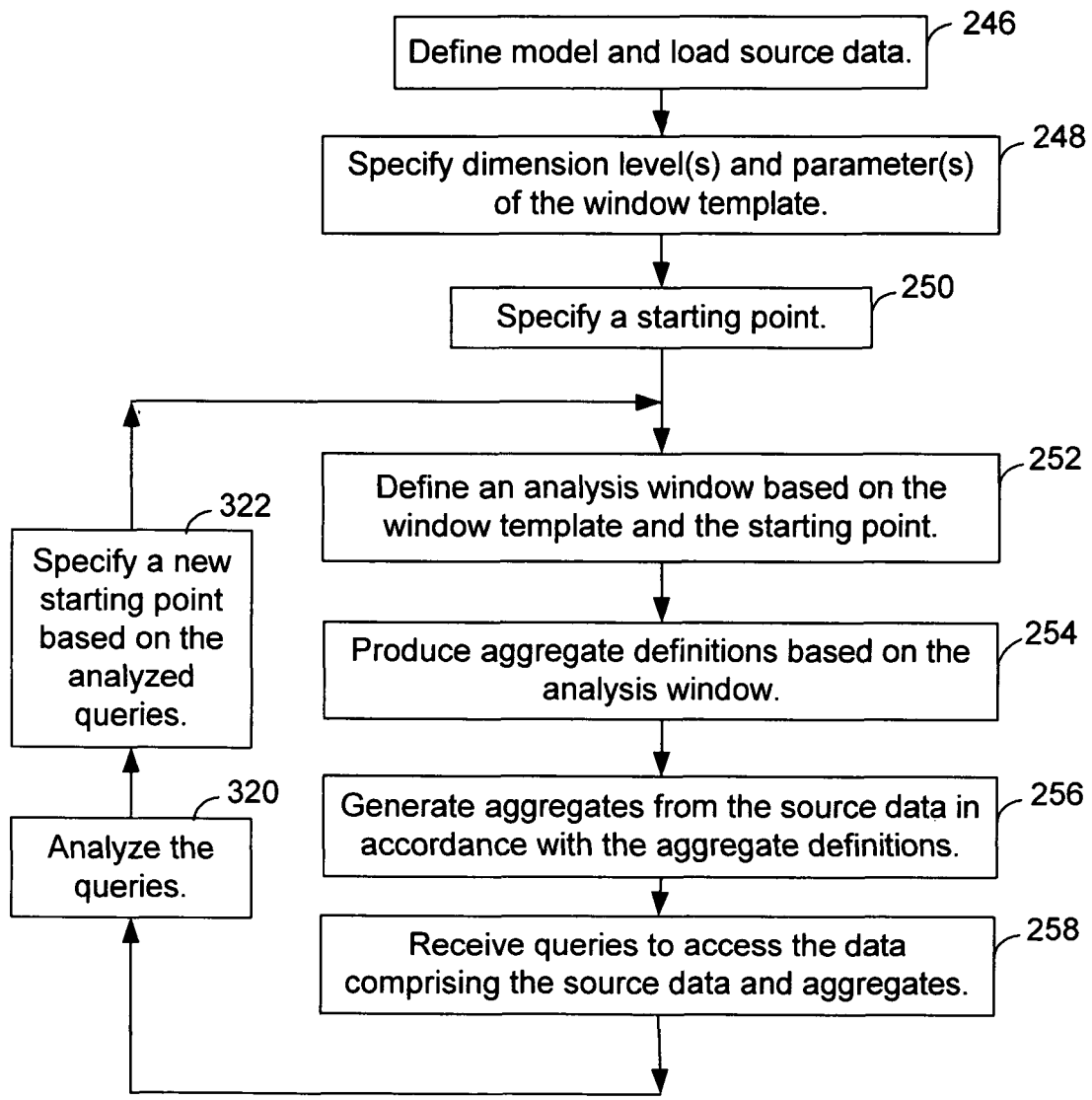
FIG. 17 depicts a flowchart of an embodiment of a technique to design and generate aggregates in accordance with a window template, and which automatically moves the analysis window based on the analyzed user queries.

FIG. 17 depicts a flowchart of an embodiment of a technique to design and generate aggregates in accordance with the window template which automatically specifies a new starting point based on analyzed queries. In various embodiments, the flowchart of FIG. 17 is implemented in the application 62 of FIG. 1. The flowchart of FIG. 17 is similar to the flowchart of FIG. 11; therefore the differences will be described. In step 320, queries are analyzed. In step 322, the starting point is adjusted based on the analyzed queries.

Figure 18:
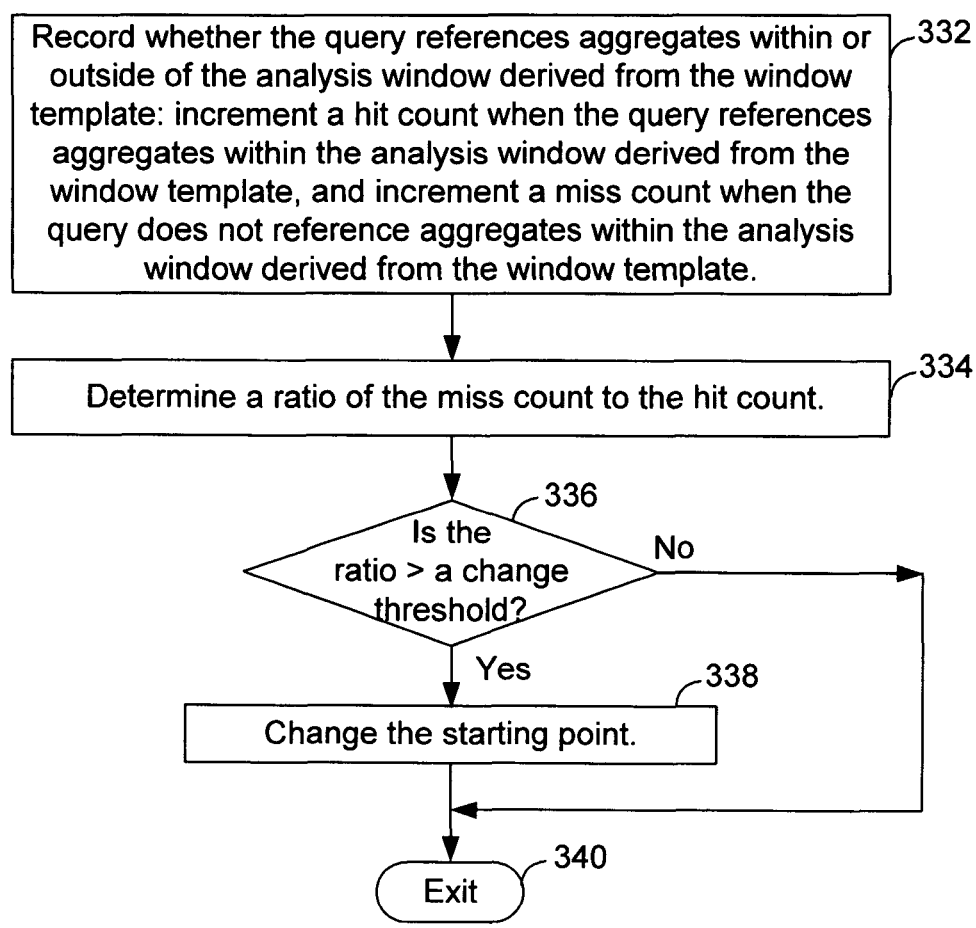
FIG. 18 depicts a flowchart of an embodiment of the steps of analyzing user queries and automatically moving the analysis window based on the analyzed user queries of FIG. 17.

FIG. 18 depicts a flowchart of an embodiment of the automatic changing of the starting point. In various embodiments, steps 332 and 334 implement step 320 of FIG. 17; and steps 336 to 340 implement step 322 of FIG. 17. Step 332 records whether the query references aggregates that are within or outside of the analysis window. A hit count represents a number of queries which reference aggregates within the analysis window. The hit count is incremented when a query references aggregates that are within the analysis window. A miss count represents a number of queries which reference aggregates outside of the analysis window. The miss count is incremented when the query references aggregates that are outside of the analysis window. In step 334, a ratio of the miss count to the hit count is determined.

Step 336 determines whether the ratio is greater than a change threshold. When the ratio is greater than the change threshold, in step 338, the starting point is changed. In various embodiments, the starting point is changed to the next member of the lowest level of the dimension in the window template. For example, if the lowest level of the window template is month, and if the current starting point is February 2004, the new starting point will be March 2004. In step 340, the flowchart exits. When step 336 determines that the ratio is not greater than the change threshold, in step 340, the flowchart exits.

Figure 19:
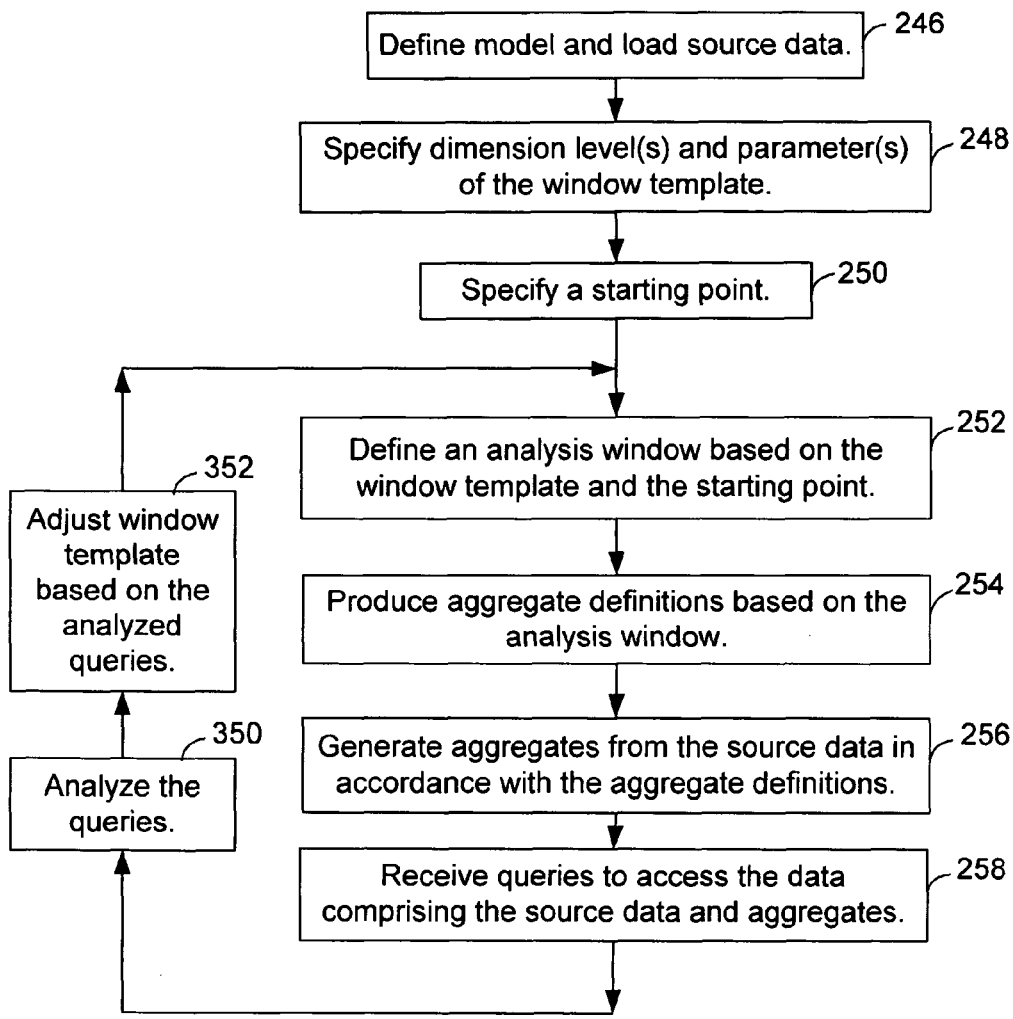
FIG. 19 depicts a flowchart of an embodiment of a technique to design and generate aggregates in accordance with a window template in which the window template is adjusted based on analyzed user queries.

FIG. 19 depicts a flowchart of an embodiment of a technique to design and generate aggregates in accordance with a window template and which adjusts the window template based on analyzed user queries. In various embodiments, the flowchart of FIG. 19 is implemented in the application 62 of FIG. 1. The flowchart of FIG. 19 is similar to the flowchart of FIG. 11; therefore the differences will be described. In step 350, the queries are analyzed. In step 352, the window template is adjusted based on the analyzed queries to provide an adjusted window template. Step 352 proceeds to step 252 to define another analysis window using the adjusted window template.

In various embodiments, the technique of the flowchart of FIG. 19 ends at step 352 and the adjusted window template is stored for later use. In some embodiments, the adjusted window template may be used when a new starting point is defined.

Figure 20:
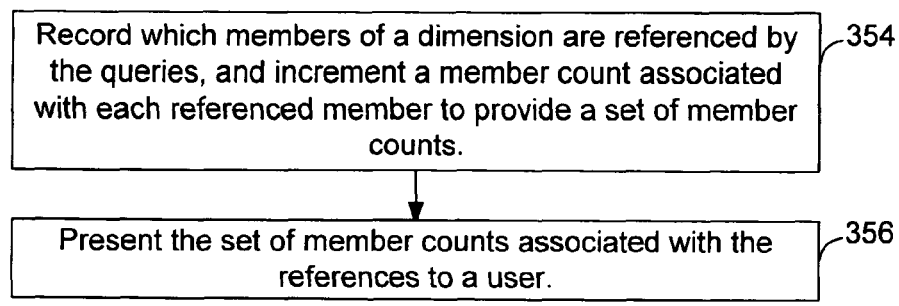
FIG. 20 depicts a flowchart of an embodiment of the step of analyzing user queries of FIG. 19 in which a user adjusts the window template.

FIG. 20 depicts a flowchart of an embodiment of the analysis of user queries of step 350 of FIG. 19. In step 354, the members of a dimension which are referenced by a query are recorded, and a count is incremented for each referenced member to provide a set of member counts. In step 356, the set of member counts associated with the references to the members is presented to the user. In step 352 of FIG. 19, the user adjusts the window template based on the results of the analysis.

As a result of the query analysis the user may see that a particular member is accessed frequently. Consequently, the user will add the corresponding relative member to the window template. For example, after the query analysis, the window template may be changed to add a new relative member by, for example, changing the number prior or parallel parameter. In some embodiments, if the number of references to a member, as provided in the set of member counts, exceeds a predetermined threshold after a predetermined period of time has passed, the member is considered to be frequently accessed and therefore the corresponding relative member in the window template is determined, and that relative member is added to the window template. In another example, the analysis may indicate that a member in the analysis window is not being frequently accessed and therefore the associated relative member is deleted from the window template. In some embodiments, a member may be considered to be not frequently accessed if the member count associated with that member is below a specified threshold after a predetermined period of time has passed.

In various embodiments, the parameters of the window template are determined by analyzing queries as the queries are issued. In other embodiments, the queries are analyzed at predetermined intervals. In some embodiments, the system monitors its own performance and dynamically analyzes the queries and adjusts the window template without user intervention. This is particularly useful in near real time systems which are constantly updated and have low down time.

Figure 21:
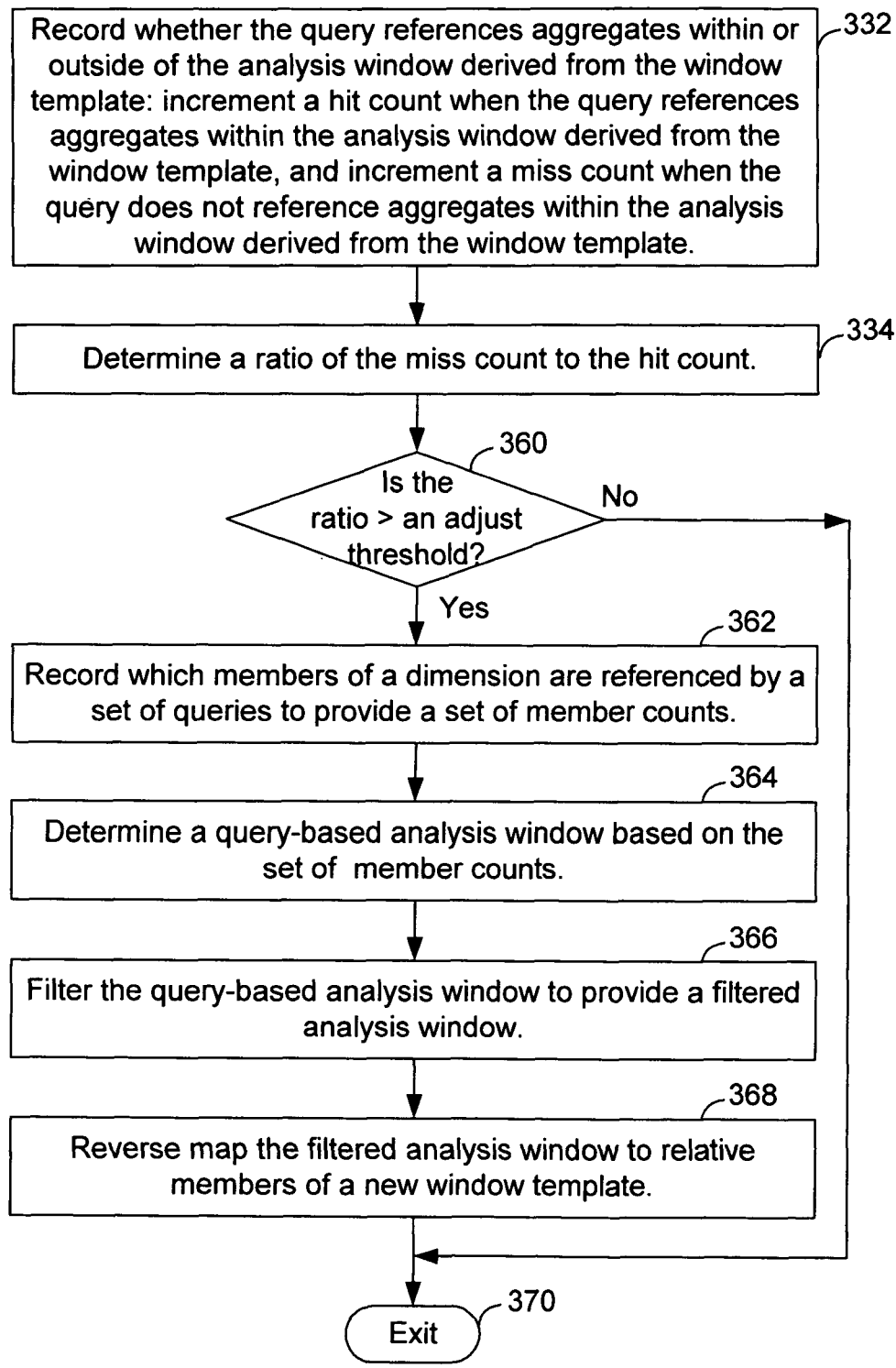
FIG. 21 depicts a flowchart of another embodiment of the steps of analyzing user queries and adjusting the window template of FIG. 19 in which the window template is automatically adjusted.

FIG. 21 depicts a flowchart of an embodiment of the dynamic adjustment of the window template. In various embodiments, the flowchart of FIG. 21 implements steps 350 and 352 of FIG. 19.

Steps 332 and 334 of FIG. 21 implement step 350 of FIG. 19. Steps 360-370 of FIG. 21 implement step 352 of FIG. 19. Steps 332 and 334 of the flowchart of FIG. 21 are the same as in FIG. 18 and will not be further described. Step 360 determines whether the ratio is greater than an adjust threshold. When the ratio is greater than the adjust threshold the analysis window may be improved and the window template will be adjusted. Step 362 records which members of a dimension are referenced by a set of queries to provide a set of member counts. In step 364, a query-based analysis window is determined based on the set of member counts. The query-based analysis window comprises every member with a member count greater than zero. In step 366, the query-based analysis window is filtered to provide a filtered analysis window of frequently accessed members. In some embodiments, if the value of the member count for a member is less than a predetermined window threshold, that member is removed from the query-based analysis window to provide the filtered analysis window.

In step 368, the filtered analysis window is mapped to relative levels and members to produce a new window template. This process is the reverse of the process described above by which an analysis window is defined from the window template. For example, the filtered analysis window comprises May 2003, April 2004 and May 2004 and the starting point is May 2004. In the new or adjusted window template, for the dimension level of month, the current parameter is set to "yes", the prior parameter is set to "yes," the number prior parameter is set to one, the parallel parameter is set to "yes" and the number parallel parameter is set to one. When step 360 determines that the ratio is not greater than the adjust count, step 360 proceeds to step 370 to exit.

In some embodiments, the flowcharts of FIGS. 17, 18, 19, 20 and 21 are applied to a set of queries which are received during a predetermined interval or intervals. In various embodiments, various counts, such as the hit count, miss count, and member counts, are set equal to zero at the predetermined interval or intervals prior to performing the flowcharts of FIGS. 18, 20 and 21. In other embodiments, the flowcharts of FIGS. 17, 18, 19, 20 and 21 are applied to a predetermined number of queries, for example, the last N queries which were received. In some embodiments, the various counts, such as the hit count, miss count, and member counts, are set equal to zero prior to applying the flowcharts of FIGS. 18, 20 and 21 to the predetermined number of queries.

In various other embodiments, any of the embodiments of the flowcharts of FIGS. 11, 13, 17 and 19 may be combined.

In some embodiments, multiple window templates are defined. For example, administrators may define more than one analysis window based on the window templates, even for the same dimension. For example, in a company, some analysts may monitor the data that is most recently loaded, while other analysts work with previous time periods to identify longer term trends.

A measure refers to a type of business data. For example, one type of measure is sales data, and another type of measure is inventory data. In various embodiments, dimensional models comprise many measures, and different window templates are applied to different measures.

In various embodiments, when multiple window templates are specified, administrators can associate "template weighting" parameters with the window templates to further guide the aggregate design, thus allowing administrators to prioritize the window templates. In other embodiments, template-level weighting parameters are applied per level within a window template. In other words, various levels within a dimension may be associated with different template-level weighting parameters.

In other embodiments, while defining an analysis window, the administrator may want to associate and adjust the window template with respect to query usage information specified for other dimensions in the system. For example, the administrator may know that typical queries for a window usually go down to the product brand level in the product dimension, and the city level in the customer dimension, but aggregate across all members in the remaining dimensions. By capturing such knowledge, aggregates can be built which include these levels from the product and customer dimension, and match the analysis window of the window template specified for the time dimension.

In some embodiments, in a database management system, summary tables store the aggregates. However, the present invention is not meant to be limited to summary tables, and in alternate embodiments, other techniques are used.

For example, Table 1 illustrates the predicate and grouping of data for three exemplary summary tables which can be generated for the exemplary analysis window of FIG. 5. In some embodiments, the aggregate definition comprises the predicate and grouping.

TABLE 1

|  | Summary Table 1 | Summary Table 2 | Summary Table 3 |
|---|---|---|---|
| Predicate | 2003 <= Year <= 2004<br>1 <= Quarter <= 2<br>4 <= Month <= 5 | 2003 <= Year <= 2004<br>1 <= Quarter <= 2 | 2003 <= Year <= 2004 |
| Grouping | Year,<br>Qtr,<br>Month | Year,<br>Qtr | Year |

In the above summary tables, aggregates are generated per level in the time dimension. When deploying to a relational database management system, this could result in three distinct summary tables, or one summary table with three slices. In another embodiment, the summary tables or slices are defined as follows:

TABLE 2

|  | Summary Table 1 | Summary Table 2 | Summary Table 3 |
|---|---|---|---|
| Predicate | Year = 2004<br>4 <= Month <= 5 | 2003 <= Year <= 2004<br>1 <= Quarter <= 2 | 2003 <= Year <= 2004 |
| Grouping | Year,<br>Qtr,<br>Month | Year,<br>Qtr | Year |

The summary tables of Table 2, above, can be merged to reduce the number of summary tables by combining the first two summary tables, as shown below in Table 3. However, more aggregates would be generated so that more space would be used. The second summary table, Summary Table 2, remains because the first summary table (Summary Table 1) cannot be used to obtain year totals.

TABLE 3

|  | Summary Table 1 | Summary Table 2 |
|---|---|---|
| Predicate | 2003 <= Year <= 2004<br>1 <= Quarter <= 2 | 2003 <= Year <= 2004 |
| Grouping | Year,<br>Qtr,<br>Month | Year |

Various embodiments of the present inventive technique have been described with respect to a single dimension; however, other embodiments of the present inventive technique are applied across more than one dimension. In some embodiments, dimensional models have more than one time dimension. For example, year can be modeled using one dimension and the hierarchy, day→month→quarter, can be modeled in another dimension. In various embodiments, window templates and analysis windows are not limited to a single dimension.

The foregoing detailed description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended thereto.

What is claimed is:

1. In an online analytical processing system, a method of designing aggregates comprising:
    defining an analysis window for a dimensional model in accordance with at least one window template and a starting point, wherein the at least one window template defines a generalized analysis window which can be moved and applied to specific and related members of a dimension, and wherein the starting point provides a reference for the at least one window template to define the analysis window;
    producing one or more aggregate definitions based on the analysis window and a weighting parameter;
    changing the starting point to a new starting point;
    repeating the defining using the new starting point to provide a new analysis window;
    storing the produced aggregate definitions in a computer system; and
    pre-computing an aggregate within each of one or more windows of interest, the windows of interest being frequently accessed analysis windows.

2. The method of claim 1 further comprising:
    adjusting the aggregate definitions based on the new analysis window.

3. The method of claim 1 wherein the window template comprises a set of one or more levels and specifies one or more relative members for each level, and the defining defines the analysis window to comprise a set of specific members based on the one or more relative members for each level, and wherein the producing the one or more aggregate definitions is based on the set of specific members.

4. The method of claim 3 wherein the set of one or more levels of the window template is in the time dimension of the dimensional model.

5. The method of claim 4 wherein the levels are relative with respect to time periods.

6. The method of claim 1 further comprising:
    specifying, by a user, the window template.

7. The method of claim 1 further comprising:
    deriving the window template from queries.

8. The method of claim 1 wherein the window template comprises at least one or a combination of one or more prior parameters and one or more parallel parameters.

9. The method of claim 1 further comprising:
    receiving queries; and
    adjusting the window template based on the queries.

10. The method of claim 1 further comprising:
    receiving queries; and
    changing the starting point based on the queries.

11. An article of manufacture comprising a non-transitory computer usable medium embodying one or more instructions executable by a computer for performing a method of designing aggregates, the instructions comprising:
    in an online analytical processing system, defining an analysis window for a dimensional model in accordance with at least one window template and a starting point, wherein the at least one window template defines a generalized analysis window which can be moved and applied to specific and related members of a dimension, and wherein the starting point provides a reference for the at least one window template to define the analysis window;
    producing one or more aggregate definitions based on the analysis window and a weighting parameter;
    changing the starting point to a new starting point;
    repeating the defining using the new starting point to provide a new analysis window;
    storing the produced aggregate definitions in a computer system; and
    pre-computing an aggregate within each of one or more windows of interest, the windows of interest being frequently accessed analysis windows.

12. The article of manufacture of claim 11 wherein the instructions further comprise
    adjusting the aggregate definitions based on the new analysis window.

13. The article of manufacture of claim 11 wherein the window template comprises a set of one or more levels and specifies one or more relative members for each level, and the defining defines the analysis window to comprise a set of specific members based on the one or more relative members for each level, and wherein the producing the one or more aggregate definitions is based on the set of specific members.

14. The article of manufacture of claim 13 wherein the set of related levels of the window template is in the time dimension of the dimensional model.

15. The article of manufacture of claim 14 wherein the levels are relative with respect to time periods.

16. The article of manufacture of claim 11 wherein the instructions further comprise:
    specifying, by a user, the window template.

17. The article of manufacture of claim 11 wherein the instructions further comprise:
    deriving the window template from queries.

18. The article of manufacture of claim 11 wherein the window template comprises at least one or a combination of one or more prior parameters and one or more parallel parameters.

19. The article of manufacture of claim 11 wherein the instructions further comprise:
    receiving queries; and
    adjusting the window template based on the queries.

20. The article of manufacture of claim 11 wherein the instructions further comprise:
    receiving queries; and
    changing the starting point based on the queries.

21. An apparatus for designing aggregates, comprising:
    a processor; and
    a memory storing one or more instructions that:
        in an online analytical processing system, define an analysis window for a dimensional model in accordance with at least one window template and a starting point, wherein the at least one window template defines a generalized analysis window which can be moved and applied to specific and related members of a dimension, and wherein the starting point provides a reference for the at least one window template to define the analysis window;
        produce one or more aggregate definitions based on the analysis window and a weighting parameter;
        change the starting point to a new starting point;
        repeat the defining using the new starting point to provide a new analysis window;
        store the produced aggregate definitions in a computer system; and
        pre-compute an aggregate within each of one or more windows of interest, the windows of interest being frequently accessed analysis windows.

22. The apparatus of claim 21 wherein the window template comprises a set of one or more levels and specifies one or more relative members for each level, and the one or more instructions that define further define the analysis window to comprise a set of specific members based on the one or more relative members for each level, and wherein the instructions that produce further produce the one or more aggregate definitions based on the set of specific members.

23. The apparatus of claim 22 wherein the set of one or more levels of the window template is in the time dimension of the dimensional model.

24. The apparatus of claim 21 wherein the one or more instructions also:

receive queries; and adjust the window template based on the queries.

* * * * *